United States Patent
Elilis et al.

(10) Patent No.: US 10,843,420 B2
(45) Date of Patent: Nov. 24, 2020

(54) RELATING TO ELECTRICALLY CONDUCTING MATERIALS

(71) Applicant: Hexcel Composites Limited, Duxford (GB)

(72) Inventors: John Elilis, Duxford (GB); Fiona Binks, Duxford (GB); Lara Jabbour, Duxford (GB); Marco Arcidiacono, Dublin (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 324 days.

(21) Appl. No.: 16/061,569

(22) PCT Filed: Dec. 12, 2016

(86) PCT No.: PCT/EP2016/080697
§ 371 (c)(1),
(2) Date: Jun. 12, 2018

(87) PCT Pub. No.: WO2017/108488
PCT Pub. Date: Jun. 29, 2017

(65) Prior Publication Data
US 2018/0361689 A1 Dec. 20, 2018

(30) Foreign Application Priority Data
Dec. 21, 2015 (GB) .................................. 1522539.4

(51) Int. Cl.
*B29C 70/88* (2006.01)
*B29C 70/06* (2006.01)
(Continued)

(52) U.S. Cl.
CPC ............ *B29C 70/885* (2013.01); *B29C 70/06* (2013.01); *B32B 15/092* (2013.01); *B32B 15/14* (2013.01);
(Continued)

(58) Field of Classification Search
CPC ....... B29C 70/06; B29C 70/885; B64D 45/02; B32B 15/092; B32B 15/14;
(Continued)

(56) References Cited

U.S. PATENT DOCUMENTS 8,947,847 B2  2/2015 Langone et al.
9,051,059 B2 * 6/2015 Fisset ........................ B32B 7/06
(Continued)

FOREIGN PATENT DOCUMENTS

EA 2011/027160 A1 3/2011
GB 2474897 A 5/2011
(Continued)

OTHER PUBLICATIONS

RU226381—English Translation.

*Primary Examiner* — Yemane Mehari
(74) *Attorney, Agent, or Firm* — W. Mark Bielawski

(57) ABSTRACT

The present invention relates to a composite material (10) comprising a layer of electrically conductive material (12) being provided on both sides with a lightweight fibrous veil (14), each veil (14) being coated on its surface remote from the electrically conductive material layer (12) with a curable thermosetting resin matrix material (16).

19 Claims, 1 Drawing Sheet

Figure 1:
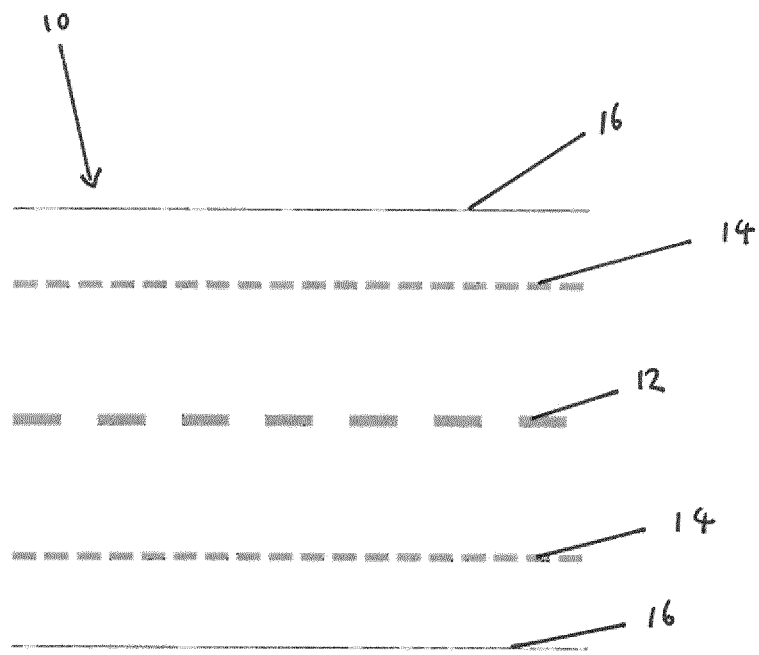

(51) Int. Cl.
*B32B 15/092* (2006.01)
*B32B 15/14* (2006.01)
*B64D 45/02* (2006.01)

(52) U.S. Cl.
CPC ...... B64D 45/02 (2013.01); *B29K 2995/0005* (2013.01); *B32B 2260/021* (2013.01); *B32B 2260/046* (2013.01)

(58) Field of Classification Search
CPC ........ B32B 2260/021; B32B 2260/046; B29K 2995/0005
USPC .................................................. 361/217, 218
See application file for complete search history.

(56) References Cited

U.S. PATENT DOCUMENTS

| | | | |
|---|---|---|---|
| 9,051,060 B2 * | 6/2015 | Fisset | B32B 5/28 |
| 9,130,363 B2 | 9/2015 | Mueller et al. | |
| 2006/0252334 A1 * | 11/2006 | LoFaro | B32B 5/08 |
| | | | 442/400 |
| 2009/0053406 A1 | 2/2009 | Ackerman | |
| 2009/0130416 A1 * | 5/2009 | Geel | D21H 13/40 |
| | | | 428/220 |
| 2009/0258220 A1 | 10/2009 | Schaaf et al. | |
| 2012/0219745 A1 | 8/2012 | Fisset et al. | |
| 2012/0219775 A1 | 8/2012 | Fisset et al. | |
| 2015/0111454 A1 * | 4/2015 | Ellis | B32B 5/26 |
| | | | 442/259 |
| 2015/0174860 A1 | 6/2015 | Ellis et al. | |

FOREIGN PATENT DOCUMENTS

| | | |
|---|---|---|
| WO | 2008/056123 A1 | 5/2008 |
| WO | 2011/051698 A1 | 5/2011 |
| WO | 2013/131657 A1 | 9/2013 |

* cited by examiner

RELATING TO ELECTRICALLY CONDUCTING MATERIALS

The present invention relates to composite materials and in particular to providing layers of electrical conducting materials for incorporation into fibre reinforced composite materials and their provision in fibre reinforced materials produced in automated lay-up equipment.

Composite materials have well-documented advantages over traditional construction materials, particularly in providing excellent mechanical properties at very low material densities. As a result, the use of such materials is becoming increasingly widespread and their fields of application range from "industrial" to high performance aerospace components including aircraft fuselages.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate. The term "prepreg" is used to describe fibres or a reinforcement fibre fabric impregnated with a resin matrix composition in the uncured or partially cured state and ready for curing. The resin matrix composition comprises one or more thermosetting resins in combination with a curative and optionally other components such as an accelerator and tougheners. The fibres may be in the form of tows or fabrics and a tow generally comprises a plurality of filaments. The fibrous materials may be of carbon fibre, glass or aramid. This invention is particularly concerned with carbon fibre and other conductive reinforcement fibers.

The chemical composition of the resins employed in the prepregs will depend upon the properties required of the cured fibre reinforced material and also the use to which the cured material is to be put. Prepregs are typically prepared by the deposition of a liquid resin composition onto a moving layer of fibrous material and compressing the liquid resin into the fibrous material whilst, at the same time, forming a layer of the resin on the surface of the fibrous material. The resin composition may be applied to one or both sides of the layer of fibrous material. The prepregs are often slit into tapes prior to lay-up.

Structures are frequently produced from prepregs or semi-pregs by superimposing (laying up) several layers of prepreg in a stack and then shaping and curing the stack to produce the final article, which may be any of a number of articles, such as aircraft components, automobile components, wind turbine components and sporting goods. In order to improve the efficiency and accuracy of the lay-up, automated lay-up techniques have been developed. The prepregs or semipregs are often slit into tapes before being laid up in tape form.

At the present time structural components such as, for example, shell modules for aircraft fuselage sections, are often produced by automated lay-up, such as by the so-called ATL-method ("Automated Tape Laying"). In the ATL process prepreg materials having been cut or manufactured to the shape of tapes, in particular carbon fibre tapes, that are pre-impregnated with a resin and that have a common width of, for example, 4 mm or 6 mm or 12 mm or 15 mm or 75 mm to 300 mm, are laid down in an automated manner by means of a suitable device on a form-defining moulding tool in various spatial directions, until the fibre composite component that is being manufactured has achieved a prescribed material thickness in all directions.

An alternative automated laying method is the so-called AFP-method ("Automated Fibre placement"). In the AFP process prepreg materials, in particular carbon fibre strands or carbon fibre bundles having been manufactured or cut to a width of from ⅛" to 1" wide are laid down automatically. Alternatively, the prepreg materials are replaced by dry fibre strands or dry fibre bundles which are subsequently impregnated with a resin matrix composition.

The ATL-method is used basically for slightly curved or flat surfaces, while the AFP-method is preferred for more complex geometries and places greater stress on the fibrous material during lay-up.

The tapes produced from the prepregs which are used in automated lay-up are typically continuous in their length, and can have lengths of several thousands of metres. Due to processing limitations such lengths may involve a splice, but this is considered to be a continuation of the same tape. Thus, the tapes can have a length of at least 500 m preferably at least 1,000 m, more preferably at least 2,000 m, most preferably at least 4,000 m. In the automated lay-up process the prepregs are slit into tapes and the variation in the width of the tapes should be minimised to provide close contact between adjacent tapes.

The substantially rectangular cross-section of the tape is typically well-defined with a clear width and a clear thickness. The width of the tapes is typically in the range of from 2.0 to 50 mm, preferably from 3.0 to 25 mm. However, depending on the applications, the width may also range from 10 to 3,500 mm, or from 50 mm to 3,000 mm, or from 100 mm to 2,000 mm, or from 150 mm to 2,000 mm, or from 200 mm to 2,000 mm. The variation around these widths should be as small as possible to ensure accurate lay-up of the slit tape. The thickness is typically in the range of from 0.05 to 1.0 mm, primarily depending on the quantity of fibres per tape as desired.

A typical automatic lay-up machine requires a roll of material such as a prepreg provided with a release paper which is loaded onto a mandrel and fed via a system of rollers to the lay-up head. Typically, the route will involve a slitting stage and an optional heating stage. The slitting stage ensures that the dimensions of the material are exactly as required, as any deviation can result in an unacceptable finish. At the lay-up head there are normally two application methods, the "shoe" or the "compaction roller" of the head. Whichever method is employed, layers of prepreg are superimposed on each other and the material is brought down into contact with the adjacent surface, and pressure is applied onto an uppermost backing sheet of release paper. The tacky lower-most surface adheres under pressure and the release paper is removed automatically. During an automatic lay-up process the material being laid down is exposed to very high tensions of between 50 and 300 N over a typical product width of 300 mm.

Following the lay-up procedure, the arrangement is cured by exposure to elevated temperature, and optionally to elevated pressure, to produce a cured composite laminate.

Composite materials have successfully been demonstrated to provide strong, light-weight and reliable structures for aerospace applications. There is thus a trend to an increasing use and gradual replacing of the traditional metallic structure. As a result, ever greater areas of aircraft are being produced from composite material.

It is important that certain components made from fibre reinforced composite are protected against lightning strikes. This is particularly important for components used in aerospace vehicles such as aircraft and helicopters, in particular aircraft fuselage, wing and tails. A typical composite material is made up from a laminate of a plurality of fibre layers, interleafed with resin layers. Although the carbon fibres have some electrical conductivity, the presence of the interleaf layers means that this is only exhibited in the plane of the laminate. The electrical conductivity in the direction orthogonal to the surface of the laminate, the so-called z-direction, is low.

The lack of conductivity in the z-direction is generally accepted to contribute to the vulnerability of composite laminates to electromagnetic hazards, such as lightning strikes. A lightning strike can cause damage to the composite material which can be quite extensive, and could be catastrophic if occurring on an aircraft structure in flight. This is therefore a particular problem for aerospace structures made from such composite materials. A well-known method of addressing this problem is to include a conductive element, e.g. metallic mesh or foil, at or near the external surface of the composite material.

Lightning strike protection means have been manually applied before or after the fibre tapes have been laid down in the component manufacture. For this purpose an electric conductor such as a ribbon-form copper foil is laid down and pressed down on load-bearing material in the form of overlapping widths. With the application of pressure and/or temperature, for example by means of a vacuum bag procedure in an autoclave, the construction is then cured to form the finished fibre composite component. The cured laminate is taken from the mould and the conductive element is present as part of the structure on the exterior of the aerospace structure it is to form.

A common way for such a conductive element to be applied is to deposit manually, by a skilled handler, the conductive element onto the surface of a mould for an aerospace body structure. Subsequently the composite material comprising sheets of structural fibres and thermosetting resin, typically in the form of prepregs, is laid on top of the conductive element. However, the need for a manual lay-up is inefficient and time consuming and not compatible with automated lay-up processes, such as ATL of AFP. The preferred conductive elements are thin metal foils such as aluminium or copper foil; however, they are not strong enough to be processed by automated slitting and tape lay-up, particularly when using automated fibre placement which provides greater stress on the foil during placement due to their placement on structures with complex shapes.

Consequently the labour required to lay down the conductive element is becoming an increasing cost and time burden on the manufacture of such structures, and ideally such conductive electromagnetic hazard protector elements would be laid down automatically during the composite material lay-up. The conductive elements are, however, fragile and prone to damage during slitting and lay-up, particularly in the automated fibre placement process.

Lay-up of the conductive material together with the automated lay-up of the tapes using an automated tape laying apparatus would be a much more efficient method of laying up the conductive surface material as compared to conventional hand lay-up. However, it does impose additional constraints on the dimensions of the strip, if it is desired to automatically lay down the prepreg at an acceptable quality standard.

A wide range of techniques and methods have been suggested to provide lightning strike protection to such composite materials. There have been many suggestions involving the addition of conductive elements at the expense of increasing the weight of the composite material.

It has been suggested that conductive particles may be included in an interleaf resin layer, as described in Russian Patent 2263581, which uses fullerite carbon particles in the interleaf layer to provide lightning protection of exposed aircraft parts. WO 2008/056123 and WO2011/027160 also provide conductive particles in the interleaf layers to improve the "Z" direction conductivity. WO2008/056123 employs metallic particles and WO2011/027160 employs hard glassy carbon particles at a level of from 0.3 to 2.0 wt % based on the total resin in the prepreg.

U.S. Pat. Nos. 8,947,847 and 9,130,363 are concerned with providing an electrical conducting layer during automated lay-up of tapes employing either Automated Tape Laying (ATL) or the Automated Fibre Placement method (AFP). Both patents recognise the need to provide reinforcement to the layer of electrical conducting material in order to obtain satisfactory lay-up during ATL or AFP. Their techniques are general to the use of many electrical conducting materials, such as metal foil or expanded metal foil, particularly copper or aluminium foils. In U.S. Pat. No. 9,130,363 a bendable reinforcement structure is applied to one or both sides of the metal strip; the bendable reinforcement can be a fibre containing layer such as a prepreg, and the width of the bendable reinforcement structure is less than the width of the metal strip so that other layers of the ultimate composite that is to be formed by the automated lay-up can get in contact with each other and bind the electrical conducting layer into the ultimate composite. According to U.S. Pat. No. 9,130,363 the electrical conducting layers are delicate thin structures which can be easily damaged, perhaps with a reduction in their conductivity. Accordingly, having exposed edges of the electrical conducting layers, as proposed in U.S. Pat. No. 9,130,363, can result in damage to the electrical conducting layer.

U.S. Pat. No. 8,947,847 employs a reinforcement layer to support at least one lightning protection strip to minimise stresses placed on the lightning protection strip while automatically applying the lightning strike protection strip during automated application of the lightning strike protection strip. The reinforced strip may be used in Automated Tape Laying or in Automated Fibre Placement. The reinforcement layer is a unidirectional fibre reinforced composite tape, which is provided on one surface with a lightning strike protection strip, which may be metal foil, expanded foil, wire mesh, wires, conductive fibres, nanotubes, conductive plastics or conductive fillers in a matrix. The surface of the strip is exposed during the automated lay-up, which can result in damage to the strip.

Conductive Composite Structures or Laminates are also known from US 2015/0174860, in which a support layer is provided to prevent distortion of the conductive layer during tape slitting.

There remains however a need to provide further reinforcement and protection to lightning protection materials, particularly to enable the lightning protection material to be provided during automated lay-up of fibrous composites, and especially during the Automated Fibre Placement technology, which can cause greater stress of the materials that are being laid up than is caused in the Automated Tape Laying process, since AFP is used to produce more complex structures, such as aircraft fuselages, wing and tail components.

The present invention aims to obviate or at least mitigate the above described problems and/or to provide improvements generally.

According to the invention there is provided a conductive layer, a process, a cured fibre reinforced composite, and a use as defined in any one of the accompanying claims.

In an embodiment, the present invention relates to an electromagnetic hazard protector for composite materials, particularly lightning strike protection for incorporation into composite materials, suitable for application in an automatic tape lay-up apparatus, which automatically lay-up layers of fibrous reinforcement material such as prepregs.

Composites for use in aerospace applications must meet exacting standards on mechanical properties. Thus, any improvements in providing conductivity must not impact negatively on the required mechanical properties.

We have found that improved lay-up, including incorporating a lighting strike protection layer in automated lay-up processes, and in particular the automated fibre placement process, can be achieved if the lighting conductive layer is sandwiched between two lightweight fibrous layers, and these layers have an outer coating of a curable thermosetting resin.

The present invention therefore provides a conductive layer comprising a layer of electrically conductive material having provided on both sides a lightweight fibrous veil, each veil being coated on its surface remote from the electrically conductive material layer with a curable thermosetting resin matrix material.

By "coated" it is meant that the outer surface of each veil is covered by a layer of the curable thermosetting resin matrix material. Furthermore, the reference to the coating being present of the surface of the veil remote from the electrically conductive material layer does not preclude the possibility of resin also being present on the surface of the veil proximate to the electrically conductive material layer. Thus, in a preferred embodiment of the present invention, the curable thermosetting resin matrix material coating each veil also penetrates the veil and contacts the layer of electrically conductive material. In particular, the curable thermosetting resin matrix material preferably forms a layer between each veil and the layer of electrically conductive material.

In a further preferred embodiment of the present invention, the curable thermosetting resin matrix material coating each veil also penetrates the layer of electrically conductive material.

We have found that the provision of the veils and the coating of a curable thermosetting resin matrix material on the outer surface of the veils, particularly wherein the resin matrix material also penetrates the veils and forms layers between the veils and the electrically conductive material, more particularly wherein the resin matrix material also penetrates the layer of electrically conductive material, provides a conductive layer that is sufficiently strong to enable slitting and lay-up, particularly in automated fibre placement, without damage to the conductive layer.

As used in the present application, the term veil refers to a lightweight fabric having a weight in the range of from 3 to 30 g/m$^2$, preferably from 5 to 25 g/m$^2$, and may comprise a thermoplastic material and impart toughness as well as providing support for the conductive layer. We prefer to use veils derived from thermoplastic fibres, particularly polyester veils or polyamide veils, which may be spunbound, spunlaced, woven, non-woven or contain chopped strands forming a fabric.

The electrical conductive material of the conductive layers of the present invention is typically metal, preferably in sheet form, and may be porous or non-porous. Preferably the electrically conductive material is porous, and the pores may be microscopic or large open holes, so that the curable thermosetting resin matrix material may penetrate the porous material to bind the components of the conductive layer together. In a preferred embodiment, the electrically conductive material is an expanded metal foil, and this may take the form of a wire mesh material. If the electrically conductive material is non-porous, it will typically comprise discrete strips, to again allow the curable thermosetting resin matrix material to penetrate the conductive layer and bind the conductive layer together from both sides of the electrically conductive material. Where the electrically conductive material is metal, any suitable metal may be used, for example bronze, aluminium, copper, silver, gold, nickel, zinc and tungsten. Copper is preferred due to its excellent electrical conductivity. The electrical conductive material may be an expanded metal foil such as the ECF materials available from Dexmet Corporation or Benmetal. Other preferred materials are copper foils or fabrics upon which a metal such as copper, aluminium or nickel has been deposited.

The thickness and weight of the layer of electrical conducting material can vary significantly according to whether a heavy duty or light duty lightning protector is required. The present invention works equally well over a range of thicknesses and weights and thus the layer of electrical conducting material preferably has a weight per unit area of from 5 to 1000 g/m$^2$, more preferably from 10 to 500 g/m$^2$, most preferably from 50 to 200 g/m$^2$.

As the layer of electrical conducting material can be selected over a wide range of weights, the weight of the conductive layers of the present invention can vary accordingly. However, the weight of the conductive layer excluding the weight of the layer of electrical conducting material is preferably maintained at a low level, and preferably the weight per unit area of the conductive layer, excluding the metal element, is less than 800 g/m$^2$, more preferably less than 500 g/m$^2$, most preferably less than 300 g/m$^2$.

The thickness of the coatings of curable thermosetting resin matrix material that are provided on the veils employed in this invention can vary according to the nature of the product that is being prepared from the laid-up conductive layers. However, we have found that the provision of outer resin layers of suitable thickness improve the properties of the conductive layers of the invention, particularly their strength and suitability for use in automated lay-up processes, particularly automated fibre placement (AFP), and also the post-production processing properties, including sandability. Preferably, therefore, the coatings of curable thermosetting resin matrix material on each of the veils have a weight of from 10 to 200 g/m$^2$, more preferably from 50 to 150 g/m$^2$, even more preferably from 70 to 120 g/m$^2$. It is also preferred that the coatings of curable thermosetting resin matrix material on each of the veils have a thickness of from 20 to 150 μm, more preferably from 30 to 100 μm, even more preferably from 35 to 55 μm.

Although it is not essential, it is preferred that the coatings of curable thermosetting resin matrix material on each of the veils comprise the same material and are of substantially the same thickness. We have found that having the same resin material on both sides of the conductive layer, and particularly having outer resin layers formed from the same resin material and having the same thickness, so that the materials are effectively symmetric, is particularly advantageous; in particular when tapes formed from the conductive layer are used in automated lay-up processes, more particularly AFP processes, because the effects of the twists that can occur during such process are minimised if both sides of the tapes have the same composition/properties.

We have also found that the use of particular curable thermosetting resin matrix materials in the conductive layers of the present invention provides additional advantages, including providing coatings that are dry to the touch at ambient temperature (and that will therefore not contaminate the automated lay-up machine), and/or are readily sandable and/or paintable.

Therefore, in a preferred embodiment of the present invention the curable thermosetting resin matrix material is a thermosetting epoxy resin composition. In particular, the curable thermosetting resin matrix material preferably comprises an epoxy resin component, more preferably an epoxy resin component that has an Epoxy Equivalent Weight (EEW) in the range from 10 to 1500, even more preferably a high reactivity epoxy resin component that has an EEW in the range of from 50 to 900, and also comprises an accelerator or curing agent.

Suitable epoxy resin components may comprise blends of two or more epoxy resin components selected from mono-functional, difunctional, trifunctional and/or tetrafunctional epoxy resins.

Suitable difunctional epoxy resin components, by way of example, include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resin components may be selected from diglycidyl ether of bisphenol F, diglycidyl ether of bisphenol A, diglycidyl dihydroxy naphthalene, or any combination thereof.

Suitable trifunctional epoxy resin components, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the trade names MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the trade name ELM-120.

Suitable tetrafunctional epoxy resin components include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), MY722 (from Huntsman Advanced Materials), and Araldite ECN 1299 (from Huntsman Advanced Materials).

Accelerators and/or curing agents may be selected based on the particular resins used and the desired properties of the final cured products, and any convenient materials may be used. However preferred curatives include hydazides, such as adipic dihydrazide, and urea based curatives, such as urones, for example aromatic substituted ureas available under the trade name Omicure U52. The accelerators and/or curatives may be used in any suitable amounts, but are preferably present in the resin matrix composition in the range of from 10 to 25 weight %, more preferably from 10 to 20 weight %, and even more preferably from 15 to 20 weight % in relation to the overall weight of the resin matrix composition.

If toughening particulate material is included in the thermosetting matrix composition, it can be of a wide variety of materials. If the additional toughening material is a polymer it should be insoluble in the matrix epoxy resin composition at room temperature and at the elevated temperatures at which the resin is cured. Depending upon the melting point of the thermoplastic polymer, it may melt or soften to varying degrees during curing of the resin at elevated temperatures and re-solidify as the cured laminate is cooled. Suitable thermoplastics should not dissolve in the resin, and include thermoplastics, such as polyamides (PAS), and polyetherimide (PEI). Polyamides such as nylon 6 (PA6) and nylon 12 (PA12) and nylon 11 (PA11) and mixtures thereof are preferred.

We have also found that using thermosetting epoxy resin matrix compositions having relatively low flow (or relatively high viscosity) is particularly advantageous in the conductive layers of the present invention. Thus, in a preferred embodiment of the present invention the thermosetting epoxy resin matrix composition has a minimum viscosity of at least 50 Pascal seconds at 116° C. after 150 minutes heating, preferably at least 100 Pascal seconds at 116° C. after 150 minutes heating, and more preferably from 100 to 500 Pascal seconds at 116° C. after 150 minutes heating, for example 180 Pascal seconds at 116° C. after 150 minutes heating. This relatively high viscosity may be achieved by using one or more epoxy components of relatively high viscosity and/or by incorporating an additive increasing the viscosity of the composition, such as an inorganic particulate filler. Suitable inorganic particulate fillers include silica, for example treated fumed silica (e.g. Cabosil TS 720) or fine particulate clays, such as hydrous pulverised and spray dried kaolin (e.g. ASP 400P), and the use of such materials also improves the surface properties of the resin, including sandability.

Where the conductive layer according to the present invention is to be laid up with prepreg materials, particularly in tape form, the curable thermosetting resin matrix material coating the veils is preferably compatible with the resin of the prepreg and can be cured under the same conditions as the resin of the prepreg.

In a preferred embodiment, the resin matrix composition may comprise a combination of one or more of the following components: a base resin component in the form of a Bisphenol F epoxy in the range of from 5 to 25% by weight of the overall weight of the resin matrix composition, a further base resin component in the form of a bis-phenol A epoxy in the range of from 3 to 20% by weight of the overall weight of resin matrix composition, a further base resin component in the form of a tetra-glycidyl amine in the range of from 12 to 30% by weight of the overall weight of resin matrix composition, a toughener in the form of a polyethersulphone in the range of from 6 to 20% by weight of the overall weight of resin matrix composition, and a curative in the form of methyl anhydride (NMA) or diaminodiphenylsulfone, preferably a micropulverised diaminodiphenylsulfone, in the range of from 2 to 28% by weight of the overall weight of resin matrix composition. The resin matrix composition may further comprise one or more fillers, such as treated fumed silica and/or a Hydrous pulverised and spray dried Kaolin, in the range of from 0.1 to 35% by weight of the overall weight of the resin matrix composition. The range of Epoxide Equivalent Weight for the epoxy resins used may be 95 to 170.

In another preferred embodiment, the resin matrix composition may comprise a combination of one or more of the following components: a base resin component in the form of a tetrafunctional epoxy resin in the range of from 35 to 55% by weight of the overall weight of the resin matrix composition, a further base resin component in the form of a unmodified solid epoxy resin in the range of 2 to 16% by weight of the overall weight of the resin matrix composition, a further base resin component in the form of an unmodified bis-phenol A solid epoxy resin in the range of 2 to 16% by weight of the overall weight of the resin matrix composition, a toughening agent in the form of a core shell rubber in liquid epoxy resin in the range of 14 to 35% by weight of the overall weight of the resin matrix composition, a curative such as a adipic dihyrazide, in the range of 2 to 16% by weight of the overall weight of the resin matrix composition, a further curative in the form of an aromatic substituted urea in the range of 2 to 16% by weight of the overall weight of the resin matrix composition, and a further component of micro encapsulated red phosphorus in an epoxy resin carrier in the range of 1 to 14% by weight of the overall weight of the resin matrix composition. The range of Epoxide Equivalent Weight for the epoxy resins used may be 117 to 800. Such a resin matrix combination is commercially available as M92 from Hexcel Corporation.

We have found that a conductive layer of this invention with a weight in the range of from 150 to 1000 g/m$^2$, preferably from 250 to 800 g/m$^2$, more preferably from 300 to 400 g/m$^2$, will withstand an applied tension of at least 1.3 kg when used in the AFP or ATL process. Furthermore such conductive layers can provide a sheet resistance surface resistivity of from 0.0005 Ohms per square to 0.005 Ohms per square, wherein Ohms per square is the unit of measurement when measuring the resistance of a thin film of a material using the four point probe technique, being equal to the resistance between two electrodes on opposite sides of a theoretical square (the size of the square being unimportant).

Such conductive layers may be co-cured with other prepregs, and have good surface properties, such as being paintable and/or sandable, and/or dry to the touch.

The conductive layers of the present invention are particularly suitable for slitting to form tapes for use in automated lay-up processes, particularly ATL and AFP processes. Thus, in a preferred embodiment of the present invention the conductive layers are in the form of strips having a width of from 2 mm to 2 m, preferably from 2 mm to 110 mm, such as 3.2 mm, 6.35 mm, 12.7 mm, 25.4 mm, 50 mm or 75 mm. The width of the slit tapes is also highly consistent, and preferably the width of each strip varies along its length by no more than 0.2 mm, more preferably by no more than 0.13 mm.

The conductive layers of the present invention may be prepared continuously by the provision of veils coated with the curable thermosetting resin matrix material to both sides of a moving layer of electrically conductive material. The materials may then be pressed together by application of pressure so that the curable resin passes through the veils to contact the layer of electrically conductive material and provides a degree of adhesion between the veils and the layer of electrically conductive material. If necessary a release film such as paper may then be applied and the material reeled for storage and transportation for subsequent use. The use in automated lay-up may require slitting the conductive layer to the required width prior to use in automated lay-up.

The present invention therefore provides a process of forming a conductive layer according to the present invention, said process comprising:
a) providing a layer of electrically conductive material;
b) providing a first veil having a layer of curable thermosetting resin matrix material coating a surface of the veil;
c) providing a second veil having a layer of curable thermosetting resin matrix material coating a surface of the veil;
d) applying the first veil to a first side of the electrically conductive material so that the layer of curable thermosetting resin matrix material coating the surface of the first veil is remote from the electrically conductive material layer;
e) applying the second veil to the second side of the electrically conductive material so that the layer of curable thermosetting resin matrix material coating the surface of the second veil is remote from the electrically conductive material layer; and
f) pressing the first and second veils together so that the layer of curable thermosetting resin matrix material coating the surface of each veil passes through the veil to contact the layer of electrically conductive material; and preferably so that the curable thermosetting resin matrix material penetrates the electrically conductive material. Preferably the process is a continuous process.

The process of the present invention may also comprise slitting the conductive layer to form one or more strips having a width of from 2 mm to 2 m, preferably from 2 mm to 110 mm, such as 3.2 mm, 6.35 mm, 12.7 mm, 25.4 mm, 50 mm or 75 mm.

In a further embodiment, the present invention provides a cured fibre reinforced composite material containing a conductive layer according to the present invention, wherein the curable thermosetting resin matrix materials have been cured. The cured fibre reinforced composite material of the invention may comprise any conventional fibre reinforcement material, including carbon, glass and aramid fibres, and the curable layer may be cured in any convenient manner.

In a further embodiment the invention provides the use of a conductive layer of this invention for the provision of lightning strike protection in aircraft and helicopters.

In a further embodiment the invention provides an automated lay-up up process in which an electrically conductive layer of this invention is automatically incorporated with tapes of prepreg in the automated lay-up up process. In particular the automated lay-up up process comprises automated fibre placement. The automated lay-up process typically lays up layers of tapes of prepregs in which one or more layers of the conductive material of this invention are included.

Figure 2:
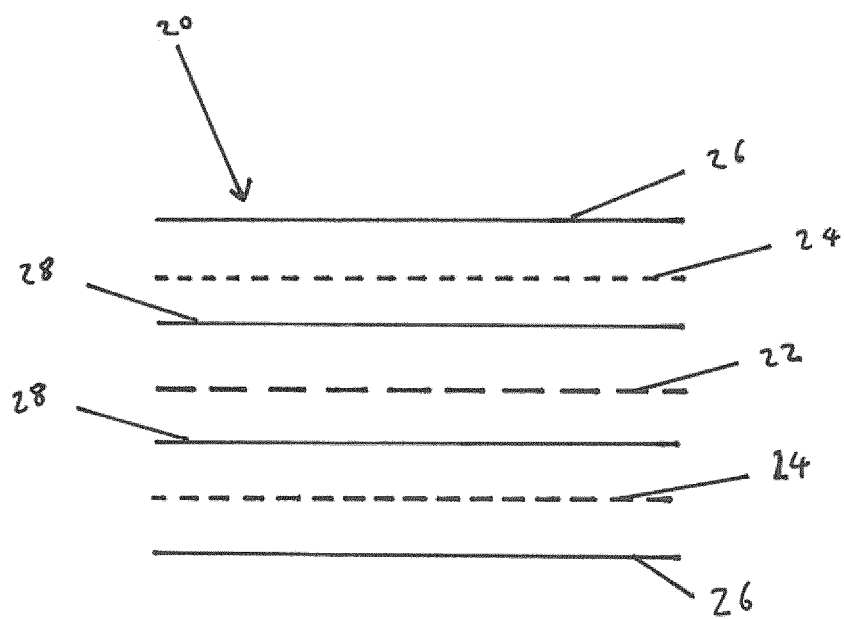

The invention will now be clarified by way of example only and with reference to the following Figure and Examples in which:

FIG. 1 shows a diagrammatic cross sectional view of a conductive layer according to an embodiment of the invention; and FIG. 2 shows a diagrammatic cross sectional view of a conductive layer according to a particularly preferred embodiment of the invention.

In FIG. 1, the conductive layer 10 comprises a central electrically conductive material 12 having provided on both sides a lightweight fibrous veil 14, each veil 14 being coated on its surface remote from the electrically conductive material layer with a curable thermosetting resin matrix material 16.

The veil 14 is polyester of 20 g/m². The resin matrix material 16 is M92 resin, as manufactured by Hexcel Corporation, and the electrically conductive material 12 is an expanded copper foil ECF 175 as supplied by Dexmet.

The material is in the shape of a tape having a width of 6.35 mm, which is suitable for lay-up in an AFP process.

In FIG. 2, the conductive layer 20 comprises a central electrically conductive material 22 having provided on both sides a lightweight fibrous veil 24, each veil 24 being coated on its surface remote from the electrically conductive material layer with a curable thermosetting resin matrix material 26. The curable thermosetting resin matrix material 26 also penetrates the veils 24, forming a layer 28 between each veil 24 and the electrically conductive material 22, and also penetrates the electrically conductive material 22.

The veil 24 is polyester of 20 g/m². The resin matrix material 26 is M92 resin as manufactured by Hexcel Corporation, and the electrically conductive material 22 is an expanded copper foil ECF 175 as supplied by Dexmet.

The material is in the shape of a tape having a width of 3.2 mm, which is suitable for AFP.

EXAMPLE 1

A conductive layer having a structure corresponding to the structure shown in FIG. 1 was prepared. The conductive layer was an annealed expanded copper foil having an area weight of 175 g/m² available from Benmetal. The veils were polyester veils having area weights of 20 g/m². The outer resin layer coatings comprised a resin matrix material based on aerospace resin M21, available from Hexcel Corporation, but comprising 1 wt % treated fumed silica and 24.3 wt % hydrous, pulverised and spray dried kaolin clay as filler materials to increase the viscosity. The area weight of the coating layers was 90 g/m². The total area weight of the conductive layer was 395 g/m². The conductive layer was prepared by providing the veils with one surface coated in the resin and placing one veil on either side of the conductive layer, with the uncoated surface of each veil contacting the conductive layer. The combined layers were then compacted together so that the resin coating each veil passed through the veil to forma layer between the veil and the conductive layer, and also to penetrate the conductive layer. A coating of resin remained on the outer surface of each veil.

EXAMPLE 2

A conductive layer corresponding to the layer of Example 1 was prepared but the conductive layer was replaced by an unannealed expanded copper foil having an area weight of 175 g/m², available from Benmetal. In addition, the area weight of the resin coating layer was increased to 120 g/m² on each veil, giving a total area weight for the conductive layer of 455 g/m².

EXAMPLE 3

A conductive layer corresponding to the layer of Example 1 was prepared but the polyester veils were replaced by carbon veils having area weights of 34 A conductive layer corresponding to the layer of Example 1 was prepared but the conductive layer was replaced by an unannealed expanded copper foil having an area weight of 175 g/m², available from Benmetal. In addition, the area weight of the resin coating layer was increased to 120 g/m² on each veil, giving a total area weight for the conductive layer of 455 g/m², giving a total area weight for the conductive layer of 423 g/m².

EXAMPLE 4

A conductive layer corresponding to the layer of Example 1 was prepared but the conductive layer was replaced by an unannealed expanded copper foil having an area weight of 175 g/m², available from Benmetal, as used in example 2. The conductive layer had a total area weight of 395 g/m².

EXAMPLE 5

A conductive layer corresponding to the layer of Example 4 was prepared, and an additional lightweight veil (area weight 4 g/m²) was added to each outer resin coating layer, giving a total area weight for the conductive layer of 403 g/m².

Each of the materials of Examples 1 to 5 were found to be suitable for use in providing electrical conductive layers in combination with prepregs, having acceptable conductive and surface properties. The materials of Examples 1 and 5 were particularly suitable, having very low surface tack and being dry to touch respectively.

The conductive layers of Examples 1 to 5 were all tested for slitting tolerance by slitting with conventional slitting equipment to form tapes having an average width of 6.35 mm. The average tape widths for tapes prepared from each material were measured by taking 10 measurements for each material using a "LaserMike" instrument, and the results are shown in Table 1.

As shown in Table 1, each of the materials of Examples 1 to 5 could be successfully slit to provide tapes having average widths of between 6.25 mm and 6.35 mm, and having very low levels of variation in width along their lengths.

TABLE 1

| | Individual width measurements (mm) | | | | |
|---|---|---|---|---|---|
| | Example 1 | Example 2 | Example 3 | Example 4 | Example 5 |
| 1 | 6.306 | 6.306 | 6.348 | 6.260 | 6.277 |
| 2 | 6.332 | 6.283 | 6.322 | 6.248 | 6.296 |
| 3 | 6.292 | 6.306 | 6.323 | 6.260 | 6.272 |
| 4 | 6.318 | 6.244 | 6.322 | 6.269 | 6.294 |
| 5 | 6.317 | 6.285 | 6.341 | 6.256 | 6.264 |
| 6 | 6.338 | 6.279 | 6.313 | 6.217 | 6.248 |
| 7 | 6.250 | 6.288 | 6.320 | 6.238 | 6.276 |
| 8 | 6.359 | 6.346 | 6.398 | 6.225 | 6.246 |
| 9 | 6.356 | 6.302 | 6.367 | 6.305 | 6.324 |
| 10 | 6.306 | 6.282 | 6.298 | 6.263 | 6.254 |
| Average | 6.317 | 6.292 | 6.335 | 6.254 | 6.275 |

The invention claimed is:

1. A conductive layer comprising a layer of electrically conductive material having provided on both sides a lightweight fibrous veil, each veil being coated on its surface remote from the electrically conductive material layer with a curable thermosetting resin matrix material; wherein the coatings of curable thermosetting resin matrix material on each of the veils have a thickness of from 20 to 150 μm.

2. The conductive layer according to claim 1, wherein the curable thermosetting resin matrix material coating each veil also penetrates the veil and contacts the layer of electrically conductive material.

3. The conductive layer according to claim 2, wherein the curable thermosetting resin matrix material coating each veil also penetrates the layer of electrically conductive material.

4. The conductive layer according to claim 3, wherein the veil comprises a lightweight fabric having a weight in the range of from 3 to 30 gsm.

5. The conductive layer according to claim 4, wherein the veil comprises thermoplastic fibres.

6. The conductive layer according to claim 1, wherein the electrically conductive material is metal.

7. The conductive layer according to claim 6, wherein the metal is an expanded metal foil.

8. The conductive layer according to claim 1, wherein the layer of electrically conductive material has a weight per unit area of from 5 to 1000 g/m$^2$.

9. The conductive layer according to claim 1, wherein the weight of the conductive layer excluding the weight of the layer of electrically conductive material is less than 800 g/m$^2$.

10. The conductive layer according to claim 1, wherein the coatings of curable thermosetting resin matrix material on each of the veils have a weight of from 10 to 200 g/m$^2$.

11. The conductive layer according to claim 1, wherein the coatings of curable thermosetting resin matrix material on each of the veils comprise the same material and are of substantially the same thickness.

12. The conductive layer according to claim 1, wherein the curable thermosetting resin matrix material is a thermosetting epoxy resin matrix composition.

13. The conductive layer according to claim 12, wherein the thermosetting epoxy resin matrix composition has a viscosity of at least 50 Pascal seconds at 116° C. after 150 minutes heating.

14. The conductive layer according to claim 12, wherein the thermosetting epoxy resin matrix composition comprises an additive increasing the viscosity of the composition.

15. The conductive layer according to claim 1 which is in the form of a strip having a width of from 2mm to 2m.

16. The conductive layer according to claim 15, wherein the width of the strip varies along its length by no more than 0.2mm.

17. A process of forming a conductive layer, said process comprising:
    a) providing a layer of electrically conductive material;
    b) providing a first veil having a layer of curable thermosetting resin matrix material coating a surface of the veil;
    c) providing a second veil having a layer of curable thermosetting resin matrix material coating a surface of the veil;
    d) applying the first veil to a first side of the electrically conductive material so that the layer of curable thermosetting resin matrix material coating the surface of the first veil is remote from the electrically conductive material layer;
    e) applying the second veil to the second side of the electrically conductive material so that the layer of curable thermosetting resin matrix material coating the surface of the second veil is remote from the electrically conductive material layer; and
    f) pressing the first and second veils together so that the layer of curable thermosetting resin matrix material coating the surface of each veil passes through the veil to contact the layer of electrically conductive material.

18. The cured fibre reinforced composite containing a conductive layer according to claim 1, wherein the curable thermosetting resin matrix material has been cured.

19. The automated lay-up process in which an electrically conductive layer according to claim 18 is incorporated with a tape of prepreg in the automated lay-up process.

* * * * *